(12) United States Patent
Mintz et al.

(10) Patent No.: US 8,694,414 B2
(45) Date of Patent: *Apr. 8, 2014

(54) SYSTEM AND METHOD FOR SIMULATING AN ELECTRONIC TRADING ENVIRONMENT

(75) Inventors: Sagy P. Mintz, Lincolnshire, IL (US); Robert West, Chicago, IL (US); Christos Kondilis, Jersey City, NJ (US)

(73) Assignee: Trading Technologies International, Inc, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,729

(22) Filed: Jul. 9, 2012

(65) Prior Publication Data

US 2012/0278224 A1 Nov. 1, 2012

Related U.S. Application Data

(63) Continuation of application No. 12/604,245, filed on Oct. 22, 2009, now Pat. No. 8,239,315, which is a continuation-in-part of application No. 10/233,023, filed on Aug. 30, 2002, now Pat. No. 7,672,895.

(60) Provisional application No. 60/358,209, filed on Feb. 19, 2002.

(51) Int. Cl.
   *G06Q 40/00* (2012.01)
(52) U.S. Cl.
   USPC .......................................................... 705/37
(58) Field of Classification Search
   USPC .......................................................... 705/37
   See application file for complete search history.

(56) References Cited

U.S. PATENT DOCUMENTS

| 4,674,044 A | 6/1987 | Kalmus et al. |
| 4,750,135 A | 6/1988 | Boilen |
| 4,807,158 A | 2/1989 | Blanton et al. |

(Continued)

FOREIGN PATENT DOCUMENTS

| EP | 0388162 A2 | 9/1990 |
| EP | 1067471 A1 | 1/2001 |

(Continued)

OTHER PUBLICATIONS

Forex Capital Market. http://web.archive.org/web/20010204084100/www.fxcm.com/index.html.Accessed Jan. 31, 2008.*

(Continued)

*Primary Examiner* — Jessica Lemieux
(74) *Attorney, Agent, or Firm* — McDonnell Boehnen Hulbert & Berghoff LLP

(57) ABSTRACT

Market data is recorded from a real live exchange. The recording data can be played back in real time or delayed, in any manner, to simulate the recorded market. Moreover, one or more users can participate in the simulated market just as if they were participating in a real-live market. The system provides a realistic trading environment without the associated risks of trading in a live-market such as losing money and the cost of making trades. The system may be used for training purposes and for purposes of testing and analyzing various trading strategies. Software developers and testers may also utilize the realistic environment to develop trading products or applications. Additionally, the system provides a means for demonstrating trading application products.

14 Claims, 5 Drawing Sheets

(56) References Cited

U.S. PATENT DOCUMENTS

| | | | |
|---|---|---|---|
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,689,651 A | 11/1997 | Lozman | |
| 5,719,796 A * | 2/1998 | Chen | 703/13 |
| 5,727,165 A | 3/1998 | Ordish et al. | |
| 5,774,877 A | 6/1998 | Patterson, Jr. et al. | |
| 5,793,301 A | 8/1998 | Patterson, Jr. et al. | |
| 5,797,002 A | 8/1998 | Patterson, Jr. et al. | |
| 5,845,266 A | 12/1998 | Lupien et al. | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,667 A | 8/1999 | Tull, Jr. et al. | |
| 5,953,708 A | 9/1999 | Midorikawa et al. | |
| 5,963,923 A | 10/1999 | Garber | |
| 6,012,046 A | 1/2000 | Lupien et al. | |
| 6,014,643 A | 1/2000 | Minton | |
| 6,035,287 A | 3/2000 | Stallaert et al. | |
| 6,044,361 A | 3/2000 | Kalagnanam et al. | |
| 6,098,051 A | 8/2000 | Lupien et al. | |
| 6,131,087 A | 10/2000 | Luke et al. | |
| 6,134,511 A | 10/2000 | Subbarao | |
| 6,134,535 A | 10/2000 | Belzberg | |
| 6,195,647 B1 | 2/2001 | Martyn et al. | |
| 6,272,474 B1 | 8/2001 | Garcia | |
| 6,278,982 B1 | 8/2001 | Korhammer et al. | |
| 6,282,521 B1 | 8/2001 | Howorka | |
| 6,317,728 B1 | 11/2001 | Kane | |
| 6,321,212 B1 | 11/2001 | Lange | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,411,998 B1 | 6/2002 | Bryant et al. | |
| 6,634,950 B2 | 10/2003 | Yoshimi et al. | |
| 6,772,132 B1 | 8/2004 | Kemp, II et al. | |
| 6,939,137 B1 | 9/2005 | Colaio et al. | |
| 7,127,424 B2 | 10/2006 | Kemp, II et al. | |
| 7,389,268 B1 | 6/2008 | Kemp, II et al. | |
| 7,610,240 B2 | 10/2009 | Mintz et al. | |
| 7,672,895 B2 | 3/2010 | Mintz et al. | |
| 7,742,959 B2 | 6/2010 | Muller | |
| 2002/0010663 A1 | 1/2002 | Muller | |
| 2002/0023038 A1 | 2/2002 | Fritsch et al. | |
| 2002/0026321 A1 | 2/2002 | Faris et al. | |
| 2002/0035534 A1 | 3/2002 | Buist et al. | |
| 2002/0055899 A1 | 5/2002 | Williams | |
| 2002/0059135 A1 * | 5/2002 | Ma et al. | 705/37 |
| 2002/0073016 A1 | 6/2002 | Furbush et al. | |
| 2002/0103741 A1 | 8/2002 | Boies et al. | |
| 2002/0107748 A1 | 8/2002 | Boies et al. | |
| 2002/0138401 A1 | 9/2002 | Allen et al. | |
| 2002/0161687 A1 | 10/2002 | Serkin et al. | |
| 2002/0161693 A1 | 10/2002 | Greenwalk et al. | |
| 2002/0178102 A1 | 11/2002 | Scheinberg et al. | |
| 2003/0004853 A1 | 1/2003 | Ram et al. | |
| 2003/0009411 A1 | 1/2003 | Ram et al. | |
| 2004/0064395 A1 | 4/2004 | Mintz et al. | |
| 2006/0259399 A1 | 11/2006 | Mintz et al. | |
| 2010/0042530 A1 | 2/2010 | Mintz et al. | |

FOREIGN PATENT DOCUMENTS

| | | |
|---|---|---|
| EP | 1321870 A1 | 6/2003 |
| GB | 2298951 A | 9/1996 |
| GB | 2366630 A | 3/2002 |
| KR | 2000-0054414 A | 9/2000 |
| WO | 90/10910 A1 | 9/1990 |
| WO | 90/11571 A1 | 10/1990 |
| WO | 95/06918 A2 | 3/1995 |
| WO | 95/06918 A3 | 4/1995 |
| WO | 98/49639 A1 | 11/1998 |
| WO | 99/19821 A1 | 4/1999 |
| WO | 99/30259 A1 | 6/1999 |
| WO | 99/53424 A1 | 10/1999 |
| WO | 00/11587 A1 | 3/2000 |
| WO | 00/48113 A1 | 8/2000 |
| WO | 00/52619 A1 | 9/2000 |
| WO | 00/62187 A2 | 10/2000 |
| WO | 00/65510 A1 | 11/2000 |
| WO | 01/11453 | 2/2001 |
| WO | 01/16830 A1 | 3/2001 |
| WO | 01/16852 A2 | 3/2001 |
| WO | 01/22263 A2 | 3/2001 |
| WO | 01/22315 A2 | 3/2001 |
| WO | 01/88808 A1 | 11/2001 |
| WO | 00/62187 A3 | 12/2001 |
| WO | 01/22263 A3 | 1/2002 |
| WO | 01/22315 A3 | 1/2002 |
| WO | 02/05182 A1 | 1/2002 |
| WO | 02/07032 A1 | 1/2002 |
| WO | 02/15461 A2 | 2/2002 |
| WO | 01/16852 A8 | 6/2002 |
| WO | 02/48945 A1 | 6/2002 |
| WO | 02/069079 A2 | 9/2002 |
| WO | 02/069079 A3 | 10/2002 |
| WO | 03/071397 A2 | 8/2003 |

OTHER PUBLICATIONS

European Search Report for EP Application No. 10182237 dated Mar. 18, 2011.

Forex Capital Markets: Registration for Demo webpage [online], Forex Capital Markets, Jan. 24, 2001. [Retrieved on Feb. 1, 2008] from the Internet: http://web.archive.org/web/20010124051100/www.fxcm.com/demo_register.html.

Forex FXCM System Overview webpage [online], Forex Capital Markets, n.d. [Retrieved on Jan. 31, 2008] from the Internet: http://web.archive.org/web/20010204084100/www.fxcm.com/index.html.

International Search Report of International Application No. PCT/US2003/00739, dated Apr. 4, 2003 (mailed Oct. 3, 2002).

Jackson, T., "Mention Art, and I Reach for My Wand," *The Independent*, London, United Kingdom, Feb. 6, 1995, p. 23. [Retrieved on Aug. 28, 2007] from the Internet: http://proquest.umi.com/, ProQuest Document ID: 36743171.

Virtual Stock Exchange, Stock Market Game and Message Boards [Retrieved from the Internet at http://web.archive.org/web/20000815201430/www.virtualstockexchange.com/info/rules_and_regulations.html on Oct. 1, 2013], Aug. 15, 2000.

* cited by examiner

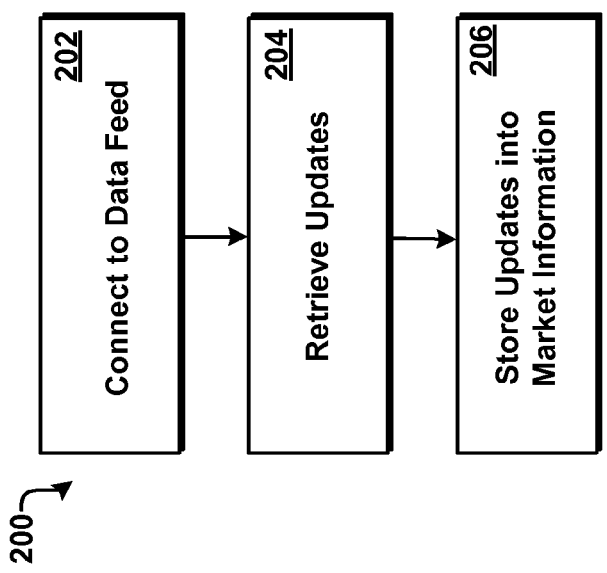

SYSTEM AND METHOD FOR SIMULATING AN ELECTRONIC TRADING ENVIRONMENT

CROSS REFERENCE TO RELATED APPLICATIONS

This application is a continuation of U.S. patent application Ser. No. 12/604,245, filed Oct. 22, 2009, now U.S. Pat. No. 8,239,315, which is a continuation of U.S. patent application Ser. No. 10/233,023, filed Aug. 30, 2002, now U.S. Pat. No. 7,672,895, which claims the benefit of U.S. Provisional Patent Application No. 60/358,209, filed Feb. 19, 2002. The entire disclosure contents of these applications are herewith incorporated by reference into the present application.

FIELD OF THE INVENTION

The present invention is generally directed to electronic trading, and in particular, to simulating an electronic trading environment.

BACKGROUND

Many exchanges throughout the world now support electronic trading. Electronic trading has made it possible for an increasing number of people to actively participate in a market at any given time. The increase in the number of potential market participants has advantageously led to, among other things, a more competitive market and greater liquidity.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 or ISDN. Some participants may link to the exchange through direct connections and through other common network components such as high-speed servers, routers, and gateways, and so on.

Regardless of the way in which a connection is established, software running on the clients allows people to log onto one or more exchanges and participate in one or more live markets. Some clients run software that creates specialized interactive trading screens. In general, the trading screens enable people to enter orders into the market, obtain market quotes, and monitor positions. The range and quality of features available varies according to the specific software application being run.

What is needed, however, is a system for simulating an electronic trading environment, such as simulating the one described above, to use for any purpose without having the known risks often associated with trading in live-markets at real exchanges.

BRIEF DESCRIPTION OF THE FIGURES

FIG. 2 is a flow chart illustrating an example process for recording and storing market information;

FIG. 3 is a block diagram of an example data file that can be used to store market information;

DETAILED DESCRIPTION

The present embodiments provide a system and related methods for recording market data from an exchange and from other trading-related sources, and generating orders based on that data to simulate the recorded market. Then, one or more users may participate in the simulated market just as if they were participating in a real-live market. According to one embodiment, a market simulator generates orders, among other things, based on the recorded data and submits those orders to a simulated exchange. Users can also submit orders to the simulated exchange. The simulated exchange receives orders from the market simulator and orders from the users and attempts to match them just like a real exchange. As a result, the system provides a realistic trading environment without the associated risks of trading in a live-market such as losing money and the cost of making trades. The system may be used for training purposes and for purposes of testing and analyzing various trading strategies. Software developers and testers may also use the realistic environment to develop trading products or applications. Additionally, the system provides a means for demonstrating trading application products.

Illustrative embodiments and example applications of a system and related methods for simulating an electronic trading environment will now be described with reference to the accompanying Figures to disclose advantageous teachings of preferred embodiments of the present invention.

System Architecture Overview

Figure 1:
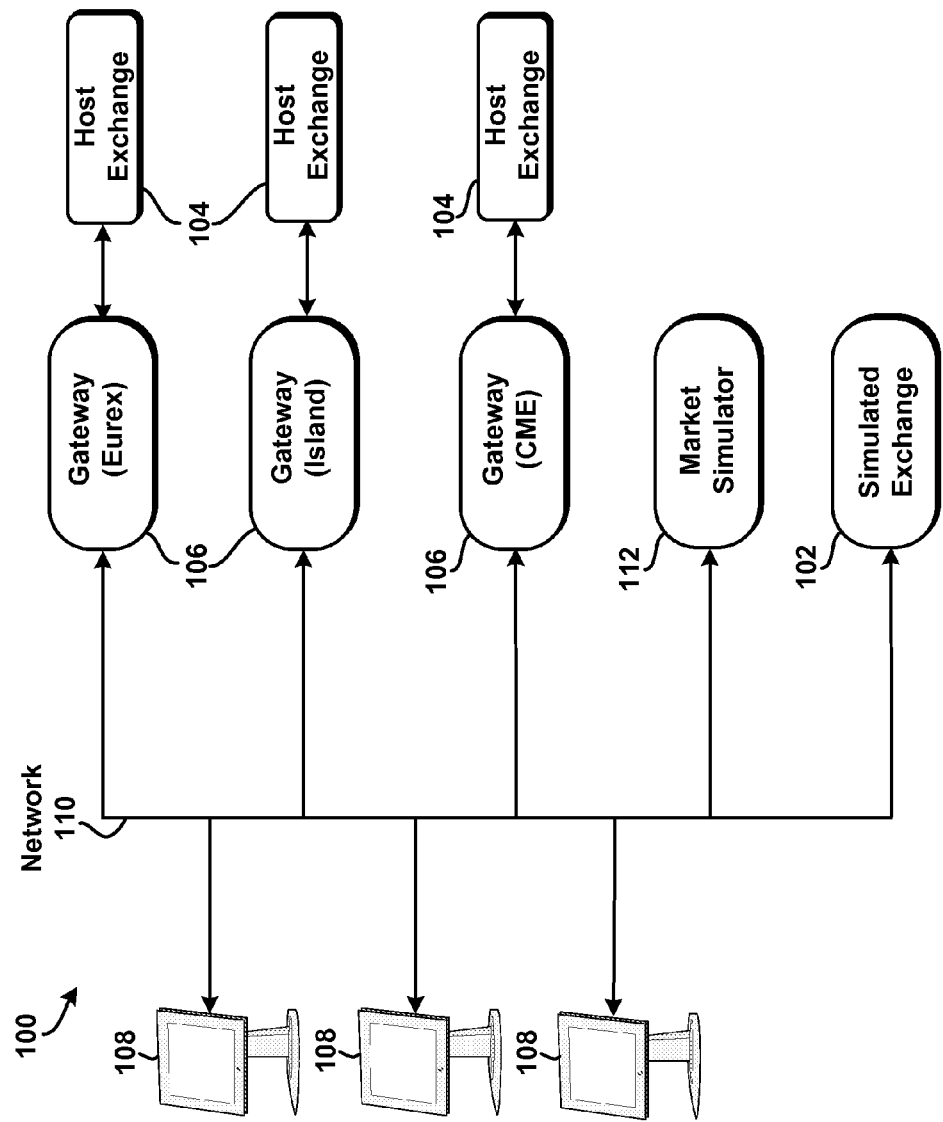
FIG. 1 is a block diagram of a system for simulating an electronic trading environment in accordance with the present invention.

FIG. 1 is a block diagram of a system 100 for simulating an electronic trading environment in accordance with the present invention. It should be noted that the system 100, as shown, could be used transparently in existing trading systems. That is, using the example system 100 described in FIG. 1, the user can log onto the simulated exchange 102 in the same fashion as logging onto a real-live exchange 104. That way, the user can trade with a simulated market at exchange 102 using the same trading applications and client devices that they would normally use to trade with a real-live market. Thus, the feel of the simulation is more realistic. However, it should also be understood that alternative system architectures might be utilized instead of the system architecture in FIG. 1. Details regarding some alternative system architectures are provided below, however, using the teachings described herein, one skilled in the art can modify and/or tailor the system or any alternative system in any fashion to suit his or her needs.

According to the embodiment of FIG. 1, the system 100 generally includes a market simulator 112, simulated exchange 102, in addition to one or more host exchanges 104, one or more gateways 106, and one or more client devices 108. A host exchange 104 might include an Electronic Communication Network (ECN) like Island, which is a well-known electronic trading facility. Other host exchanges include the Chicago Mercantile Exchange (CME), the Xetra (a German stock exchange), and the European derivatives market (Eurex). The gateways 106 are computers, or software program(s), running software that receives information from the host exchange (e.g., price, order, and fill information). The client device 108 is a computer, or software program(s), which receives one or more data feeds from the gateways 106 via network 110. The host exchanges 104, gateways 106, client devices 108, market simulator 112, and simulated exchange 102 are explained below in their respective sections.

Each host exchange 104 might provide different types of information, and relays this information, or a portion thereof, collectively referred to as a data feed, over network 110 to market participants or traders. A data feed from one host exchange may contain different information representing different tradeable objects than another data feed from a second exchange. However, it is not necessary in the preferred embodiment that the data feeds from host exchanges include similar or different data. As used herein, the term "tradeable objects" refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user.

In general, a data feed may include information representing prices and quantities for a tradeable object. For example, a data feed could contain market depth information in addition to inside market information. The inside market includes data representing the highest bid price (highest buy price) with quantity and the lowest ask price (lowest sell price) with quantity. Market depth includes data representing each available pending bid and ask quantity (or any aggregation or combination thereof), entered at a particular price, in addition to the inside market. The data feed can contain other types of market information such as the last traded price (LTP), the last traded quantity (LTQ), total traded quantity (TTQ), order information, and/or fill information. The information in a data feed, whether it contains inside market and/or market depth information or additional market information, is generally categorized into three groups referred to as price, order, and fill information.

In an embodiment, each host exchange 104 sends a data feed to a gateway 106. The data feed preferably carries all of the information that the host exchange 104 provides, such as price, order, and fill information, and alternatively may include more (or less) information. Host exchange 104 may send its data feed to the gateway 106 through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 or ISDN. Some participants may link to the exchange through direct connections and through other common network components such as high-speed servers, routers, and gateways, and so on. A common network that utilizes a variety of direct connections and other common network components is the Internet.

As mentioned earlier, gateway 106 is one or more computers (or program(s)) that receive information from the host exchange 104. As used herein, a computer includes any device with memory and a processor capable of processing information to produce a desired result or outcome. Thus, a gateway can be a computer of any size such as a server, workstation, personal computer, or laptop, but generally, the gateway is any computer device that has the processing capability to perform the function described herein. A program represents a sequence of instructions that can be executed by a computer. Note also that the functions of a gateway could be moved to a host exchange and/or client device to reduce or eliminate the need for the gateway.

In an embodiment, gateway 106 receives a data feed from a host exchange 104. Preferably, the gateway 106 receives the data feed and converts it to a form compatible with the protocols used by the client device 108 using conversion techniques known in the art. In addition, as known by those skilled in the art, gateway 106 may have one or more servers to support one or more data feeds, such as a price server for processing price information, an order server for processing order information, and a fill server for processing fill information. Generally, a server is a computer or program that responds to commands from a client in the form of subscriptions. That is, a trader at a client device can subscribe to price information, order information, and fill information for that exchange. Once a client device 108 has subscribed to the information, the gateway 106 publishes the information to the client device 108.

As mentioned before, client device 108 includes one or more computers (or program(s)) that allow a trader to participate in a market at a host exchange 104. In general, it uses software that creates specialized interactive trading screens on the client device's terminal. The trading screens enable traders to enter and execute orders, obtain market quotes, and monitor positions. The range and quality of features available to the trader on his or her screens varies according to the specific software application being run.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static price axis (or scale). The preferred embodiments, however, are not limited to any particular product that performs the translation, storage and/or display functions. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, now U.S. Pat. No. 6,772,132, and U.S. patent application Ser. No. 09/971,087, entitled "Click Based Trading With Intuitive Grid Display Of Market Depth and Price Consolidation," filed on Oct. 5, 2001, now U.S. Pat. No. 7,127,424, the contents of both are incorporated by reference herein. Moreover, the trading application may implement tools for trading tradeable objects that are described in a U.S. patent application Ser. No. 10/125,894 filed on Apr. 19, 2002, entitled "Trading Tools for Electronic Trading," now U.S. Pat. No. 7,389,268, the contents of which are incorporated by reference.

Market simulator 112 is a software program (or programs) hosted at a computer. In an embodiment described with respect to FIG. 1, the market simulator 110 is connected to one or more host exchanges 104 so that market data can be recorded directly from one or all of the host exchanges 104. The recorded data may be stored at a computer, in a database, or some other known storage means. In a preferred embodiment, the market simulator 112 generates orders based on the recorded data and submits those orders to the simulated exchange 102. Preferably, the market simulator 112 recreates the market as it once was, replicating order entry of hundreds, if not thousands, of traders. The market simulator 112 forwards orders to the simulated exchange 102 for possible matching and execution.

Simulated exchange 102 is a software program (or programs) hosted at a computer. In the embodiment described with respect to FIG. 1, the simulated exchange 102 receives orders from the market simulator 112 and matches them in a similar fashion to a real exchange. Alternatively, the simulated exchange 102 can be programmed in many different ways to simulate the matching behavior of different exchanges or to implement a unique matching algorithm. Users can participate in the simulated market in the same ways that a user can participate in real exchanges (e.g., by submitting buy and/or sell orders to the simulated matching engine 102 via client devices 108).

It should be understood that the system architecture shown in FIG. 1 is one example of the many ways in which the simulated trading environment may be implemented. For example, according to another embodiment, the market simulator 112 and the simulated exchange 102 do not necessarily have to communicate with the host exchanges 104. In this embodiment, market data can be recorded and stored separately. The market simulator 112 can access the stored market data and then play back in a similar fashion as in the embodiment described with respect to FIG. 1. In yet another embodiment, market simulator 112 and simulated exchange 102 are both hosted at the client device 108. In this embodiment, a user can trade against the simulated market on his or her machine without the need for a network connection.

Recording Market Data

FIG. 2 is a flow chart 200 illustrating an example process for recording and storing market information. The example flowchart 200 includes the steps of connecting to a data feed 202, getting updates 204, and storing updates into market information 206. It should be understood that the flow chart 200 provides only an illustrative description, and that more or fewer steps may be included in the flow chart 200, and/or the steps may occur in one or more orders which are different from the order of steps shown in the Figure.

In step 202, a market simulator connects to a data feed. In one embodiment, the data feed may contain price information from a live feed of an exchange. The price information can come as price updates or as a complete picture of the market at periodic intervals. Although it is not necessary, the data feed might also contain order information and fill information. Other information may also be provided such as last traded price (LTP), last traded quantity (LTQ), total traded quantity (TTQ), total traded quantity, highs and lows, and exchange status. Note that the system could be programmed to record the information contained in any data feed available from an exchange or similar information provider. In another embodiment, a data feed may also contain trading related news, or equivalently, news that affects the market in some manner (e.g., unemployment numbers, etc.). Sometimes, it is beneficial to record news so that it can be re-played along with the market information to create an ultra-realistic trading environment. In this embodiment, the market simulator could record news feeds from information providers such as Bloomberg, Reuters, and other such information providers.

In step 204, updates are retrieved. Some exchanges provide information in the form of updates (provide only values that change) rather than provide information in the form of a snapshot (or a copy of all values whether or not they have changed) of the market at periodic intervals. For example, some exchanges give price updates. A price update might occur when quantity available at a price level changes. To illustrate a price update, assume that there is a bid quantity of 100 at a price of 50. Some time later, the bid quantity might have changed to 75 at the price of 50. A price update in this example would indicate the change from 100 to 75 at the price of 50. However, some exchanges do not provide price updates, but rather provide a snapshot or copy of all values in the market at periodic intervals whether the values changed or not. Using the above example, three snapshots of the market at three sequential time intervals might look something like 100 at a price of 50 (first interval), 100 at a price of 50 (second interval, assuming that the quantity has not yet changed), 75 at a price of 50 (third interval). In the instance where updates are not provided, the system can generate updates from the snapshots by comparing values at sequential intervals. According to the snapshot example above, an update would have been recorded between the second and third intervals. Storing only the updates can reduce the amount storage needed. Moreover, news events can be recorded in a similar fashion (e.g., news updates or snapshots of the news can be taken at periodic intervals).

In step 206, updates are stored. Updates (e.g., price updates, news updates, LTP, LTQ, TTQ, total traded quantity, highs and lows, exchange status, etc.) may be stored in permanent or semi-permanent form. The stored information is collectively referred to as market information. Although playback is described below, during playback, market information is used to simulate the market and/or conditions that occurred during the time in which the data was recorded. Market information can be played immediately (real time), or it can be delayed and played at any time in the near or distant future. For example, the data can be recorded and played back immediately, or the data can be recorded and some time later (while it is still recording) the data can be played back, or the data can be recorded and some time after the recording is complete (e.g., stopped recording) the data can be played back.

FIG. 3 is a block diagram of an example data file 300 used to store market information. According to this embodiment, the data file 300 includes a time stamp 302, price level 304, activity code 306, new value 308, old value 310, and code 312. The Figure shows one preferable type of data file format suitable for use with the present embodiments, however, other types of data file formats or formats with more or fewer information fields may be utilized.

Referring to example data file format 300, time stamp 302 is preferably stored in units of milliseconds since midnight. This allows recordings to be time synced, but alternative methods of synchronizing can be used. Time stamps based on alternative units and reference points may be used. Price level 304 stores price levels in ticks, where a tick is the lowest valued price unit for the tradeable object. Activity code 306 stores a code that is used to represent the kind of information contained in the data file format for a particular row of information. For example, an "@" symbol might indicate the beginning of the file, a "~" symbol might indicate a change in quantity at the price level, a "T" might indicate that a trade has occurred, and an "N" might indicate news. New value 308 stores the new quantity if the activity code for that row contains a "~" symbol, but alternatively, new value 308 may be used to store other types of information associated with the activity code 306. Old value 310 stores the old quantity if the activity code for that row contains a "~" symbol, but alternatively, old value 310 can store other types of information associated with the activity code 306. Code 312 can store other types of information such as seed values like volume, open price, closed price, settlement, last traded price, etc.

Figure 4:
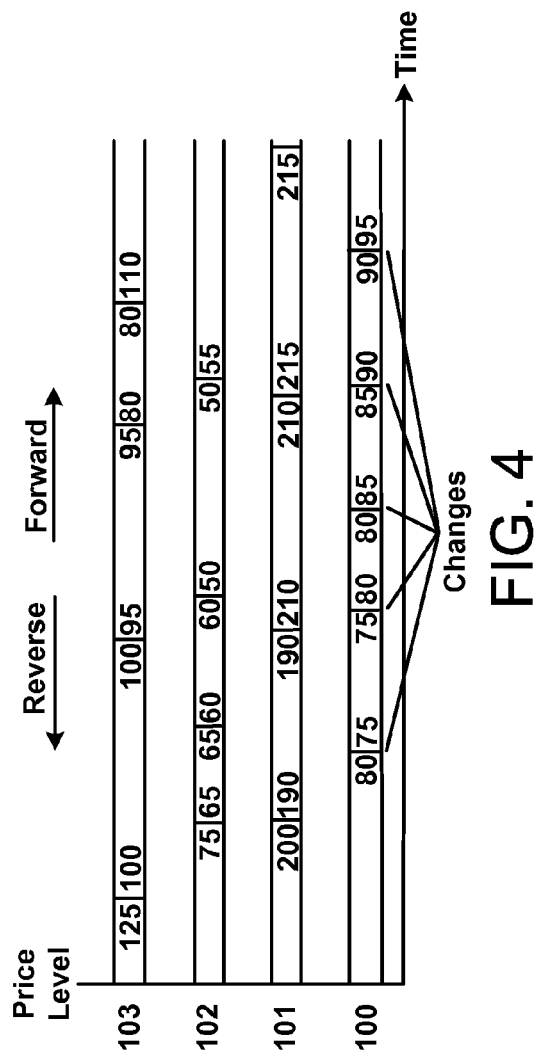
FIG. 4 is a graphical illustration for showing an alternative way to view how market information can be used.

FIG. 4 is a graphical illustration for showing an alternative way to view how market information might be used. Example numbers are used in the graphical illustration. The changes in quantity are recorded at four sample price levels 100, 101, 102, and 103. Proceeding forward in time, the quantity at price level 100 has changed from 80 to 75, 75 to 80, 80 to 85, 85 to 90, 90 to 95 and so on. Quantities at other price levels have changed as well. Preferably, the data file format stores only the changes so that if a few changes (e.g., 5 changes) occur over a long period (e.g., 1 hour), then only the changes are recorded versus recording the data over the period (e.g., recording 5 changes versus recording 1 hour worth of data). Even though the data file stores only the changes, it preferably contains the same amount of information as storing data collected over the entire period. Moreover, because the old values (in addition to the new values) are stored when a change occurs, the system can play the file in reverse just as efficiently as in forward motion without the need to laboriously scan ahead in the file for values.

Referring back to FIG. 3, the data file format 300 should be accessed sequentially, because according to this embodiment, the data is the sum of the event up to this point. Therefore, seeking a specific time point is found by playing forward or reverse until the specified time point is crossed.

As mentioned earlier, it is preferable to store the information in units of milliseconds since midnight. To play one-second of data, the current time stamp is tracked, and 1,000 is multiplied by it. To play at some other speed, another offset may be chosen. For example, if the current time stamp is multiplied by 500 then the data will play back half the "normal" speed, whereas if the current time stamp is multiplied by 2,000 then the data will play back two times the "normal" speed.

Preferably the system can replay market data in real time, or equivalently, as it happens in the market. However, it should be noted that to play the data in real time, it might be beneficial to take into account the actual processing time between updates, in which the processing time needed may related to the type of processor used, the operating system limitations, and so on. Due to slower processing times, drift might occur. An example is provided to illustrate how in one embodiment the problem of drift may be dealt with. Assume that an update of market information occurs at one second intervals (e.g., 1, 2, 3, 4, 5 . . . ). Assume also that the system requires 1.5 seconds to apply the update at time 1. (Note that this is an extreme example, normal processing time may be only in the milliseconds or less.) Therefore, the system is ready to process another update 2.5 seconds later, but it would have skipped the update at the 2-second interval. To resolve this problem, at the 3-second interval, the system would apply any missed updates including the update at the 3-second interval. For this example, the system would then apply both of the updates: one update for the 2-second interval and one update for the 3-second interval. Thus, according to this embodiment, all data updates are preferably used, rather than dropping updates because of slow processing time.

Another solution includes playing back every single update that is received from the data feed one at a time, rather than in blocks of time. The alternative solution can accurately follow the original recording (although at a playback rate very different from the original), which would then allow very accurate trading strategy testing to occur.

Simulating a Market

In general, the recorded market information is used by the market simulator to generate orders by "reverse engineering" the recorded market information back into orders. The generated orders are sent to a simulated exchange. The simulated exchange matches the orders and disseminates fill and/or price information. As a result, generated orders and fill and/or price information from the simulation will match precisely (or almost precisely) to the order and fill and/or price information as it occurred in the real market at the time it was recorded. Because orders are generated and sent to a simulated matching engine, the system also allows one or more traders to participate in this simulated trading environment. To accomplish this, the system, such as the example system in FIG. 1, generally includes a market simulator and a simulated exchange. Moreover, the system includes a trading application hosted on a client device if a trader is participating in the simulated trading environment.

Figure 5:
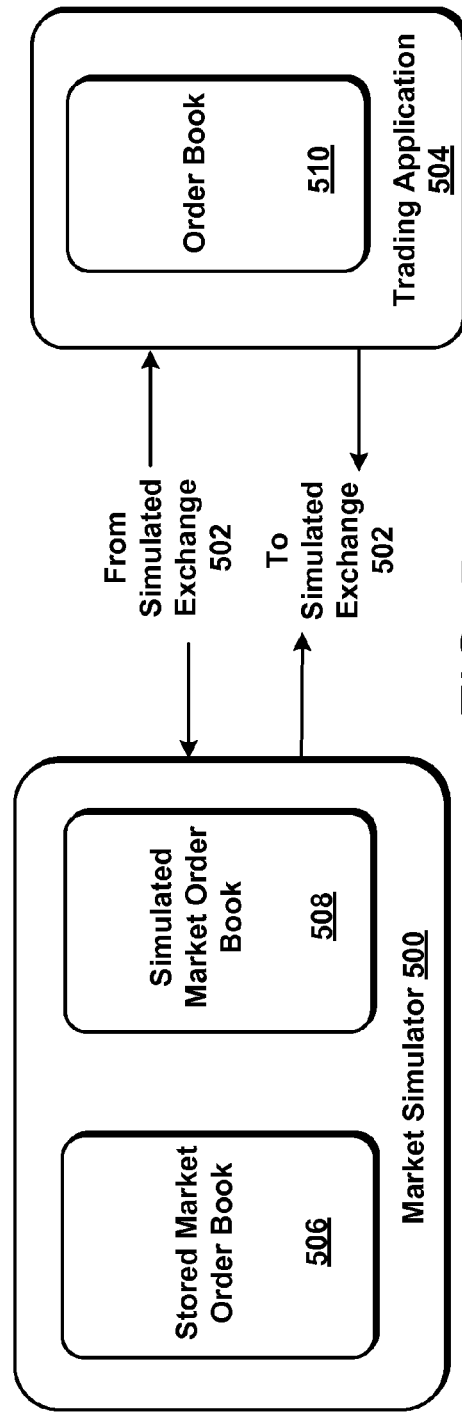
FIG. 5 is block diagram used to illustrate how information may be communicated between various components of a trading simulator, a matching engine, and trading application.

FIG. 5 is block diagram used to illustrate how information is preferably communicated between various components the system including a market simulator 500, a simulated exchange 502, and trading application 504. Generally, the market simulator 500 includes a stored market order book 506 and a simulated market order book 508. The trading application 504 includes an order book 510. The stored market order book 506 represents the recorded market. It might represent, among other things, the recorded inside market, and if available, the recorded market depth. The stored market order book 506 provides the next state of market values (e.g., price levels, quantities, etc.). The simulated market order book 508 represents the current state of the simulated market such as orders/fill information sent from the simulated exchange 502. Therefore, the simulated market order book 508 reflects the market activity that occurs at the simulated exchange 502.

Figure 6:
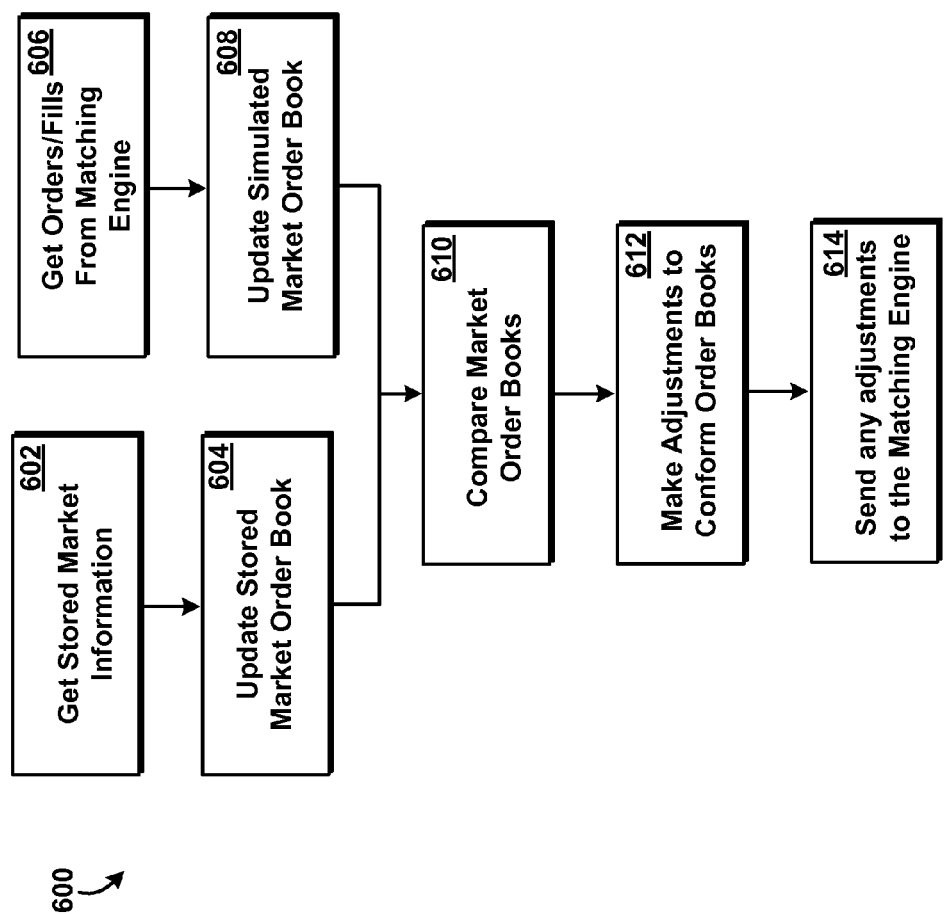
FIG. 6 is a flow chart illustrating how the components shown in FIG. 5 might interact to simulate an electronic environment.

FIG. 6 is a flow chart 600 for illustrating how the components shown in FIG. 5 might interact to simulate a market. Note that the flow chart 600 illustrates a method for simulating the market, and does not necessarily allow a user or users to "move" the markets for a long period (e.g., by submitting large orders). Rather, in a preferred embodiment, the system attempts to equalize the simulated market with the recorded market. Because the method directly simulates the recorded market, it becomes a useful tool to test trading strategies to determine how well the strategy would have worked in a real market. Other advantages are described below.

In step 602, market information, which is stored in a data file format such as that shown in FIG. 4, is retrieved from storage. If market information includes news (or other types of recorded data), then the news (or other types of data) would preferably be directed to a separate component for output to the user(s). Per step 604, the stored market order book is updated to reflect the market information received in step 602.

In step 606, order and fill information is received from the simulated exchange. Order information may include orders, which have been submitted to the simulated exchange for matching. According to a preferred embodiment, submitted orders may come from users actively trading with the system and/or the orders may be generated from the stored market information (e.g., see step 614). Per step 608, the simulated market order book is updated to reflect orders and fills.

In step 610, the stored market order book and the simulated market order book are compared. This step allows the system to compare and then equalize (e.g., see step 612) the two order books so that the system can accurately simulate the recorded market. In a preferred embodiment, the two order books are compared and orders are generated (e.g., see step 612) in such a way as to equalize the two order books. The generated orders are sent to the simulated exchange (e.g., see step 614).

In step 612, the two order books are equalized by making adjustments to conform the two order books. The algorithm below serves to synchronize the stored market order book to the simulated market order book. As previously stated, orders and/or other types of transactions (e.g., delete orders) are generated as a result of comparing the two order books. However, if the two order books are the same, then orders and/or other types of transactions need not be generated. The algorithm below provides one way to generate orders and/or transactions which are then sent to the simulated matching engine. Note that the invention is not limited to any particular algorithm, and different algorithms may alternatively be used, depending on how it is programmed.

In a preferred embodiment, to update the simulated market order book: Send delete buy order messages to the simulated matching engine to delete orders with a price >Old buy inside price or New sell inside market price. Send delete sell order messages to the simulated matching engine to delete orders with a price <Old sell inside market price or New buy inside market price. If so desired, send delete messages to delete all orders outside the range of depth provided by the simulated exchange. For example, some exchanges provide 5 price levels of market depth, therefore, delete any orders outside of that range. For every price level in simulated market order book: If the simulated order book 508 quantity is above the stored market order book 506 quantity, then delete enough orders (using LIFO last in first out to best guess the behavior of a real market) by sending a delete transaction message to the simulated exchange 502 to equalize them. In some instances, it may be necessary to delete more than enough orders, and then add quantity later. For example, if the old value is 20 which is made up of two 10-lot orders and the new value is 15, then one 10-lot order should be deleted and an order for 5 should be added (see the next step for adding orders). Alternatively, all of the orders could be deleted (e.g., the two 10-lot orders in the above example) and an order for 15 could be added, but might undesirably impact the way the orders are matched at the simulated exchange 502. In another alternative embodiment, rather than adding and deleting orders, orders in the simulated market can be changed using the simulated exchange's order change mechanism to accomplish a similar result (this might also impact the way orders are matched at the simulated exchange 502). If the simulated order book 508 quantity is below the stored market order book 506 quantity, then send one or more orders to the simulated exchange 502 to equalize them. If the following is true: inside buy price≤new LTP≤inside buy price, then send an opposing order with a quantity equal to the LTQ to the simulated exchange 502 and also increase quantity at that price level by LTQ, and if not then seed the simulated exchange 502 with the LTP and LTQ. To seed other types of market information by directly inputting values to the simulated exchange 502: seed the simulated exchange 502 with volume, highs and lows, settlement, open, close, and other types of market information, if needed.

In one embodiment, all incorrect order levels are adjusted every time an update is performed. For example, if someone filled against all outstanding working orders, the next time orders are updated, all of the orders levels are immediately (or near immediately) corrected.

In another embodiment, the trading simulator attempts to replace the incorrect orders in a more natural manner. Orders that have been filled (or orders added/deleted) are scheduled for replacement some time, which is adjustable, in the near future. For example, a random time may be selected within the next 15 seconds for the equalization of the two orders books to occur (e.g., adding orders or deleting orders, etc.). For example, if someone were to match against all outstanding orders at the simulated exchange, the deleted outstanding orders are preferably replenished at random intervals over the following 15 seconds (similar to what might happen in a real market). Preferably, this delay in replacement is circumvented if there is any change to the price level from the incoming data stream (an update in the price data has priority over a delayed replenishment). Other types of equalization methods may be used to equalize the simulated market order book with the stored order book in a more natural manner.

Interface for Recording and Playback

Figure 7:
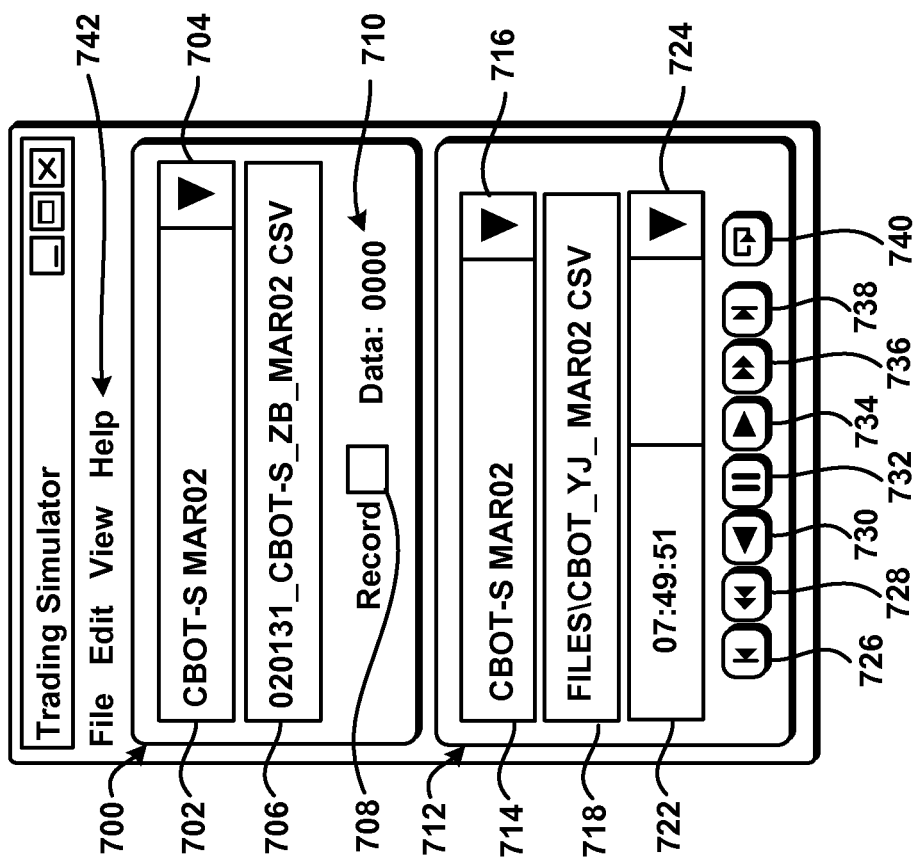
FIG. 7 is a graphical illustration of an example two-pane interface for recording and playing market information.

FIG. 7 is a graphical illustration of an example two-pane interface for recording and playing market information in accordance with the present embodiments. The recording pane 700 is used to record market information, and the playback pane 712 is used to playback the market information. Of course, other types of interfaces for recording information and playing it back may be used. The interface gives an administrator or user the ability to record market information from any exchange and/or information provider and play it back at the time of recording or some time later. The more information that can be recorded and played back, such as the inside market, market depth, and news, the more realistic the trading environment becomes. Although the interface is shown as a two-pane interface for both recording and playback, each pane may be displayed separate from the other (e.g., record only interface, playback only interface, etc.). Before describing the recording and playback portion, the user can access additional functionality by using the menu bar 742.

An example menu bar 742 is shown as a bar displayed on the interface. Names of available menus are displayed in the menu bar 742 and the names include File, Edit, View, and Help. Of course, other types of menus may be used, depending on how it is programmed. Each menu can be selected by choosing one with the keyboard or with a mouse (or some other input device) to cause a list of options in that menu to be displayed. For example, the File menu might include the following options:

| | |
|---|---|
| New | Opens a new instance of the trading simulator. |
| Open | Opens a file search dialog box to select a saved instance of a file. |
| Save | Opens a file search dialog box to save the current trading application session for later replay. |
| Save As | Opens a file search dialog box to save the current training application session under a different name/location for later replay. |
| Recent File | Provides a list of the most recently recorded/replayed files. |
| Exit | Exits the current training application session |

The edit menu might include the following options:

| | |
|---|---|
| Undo | Undoes the prior command. |
| Cut | Cuts the selected information and moves it to the operating system's clipboard. |
| Copy | Copies the selected information to the operating system's clipboard. |
| Paste | Pastes the contents of the operating system's clipboard in the cursor location. |
| Record Start All | Starts the recording function for all populated contracts in the record pane. |
| Stop All | Stops the recording function for all populated contracts in the record pane. |
| Replay Play | Starts the replay for the populated windows in the replay pane. Other available options include: All-plays back all contracts; Live-plays back all live contracts; Pause-Pauses all contract playback; |

-continued

| | |
|---|---|
| | Repeat-Atomically repeats all contract playback; and None-Stops playing all contracts. |
| Synchronize | Sets the rate at which the market simulator will update its order book (note that this is not always equal to the speed of playback). |
| Rate | Sets the rate at which the data feed will replay in the replay pane windows. |
| Immediate Update | Replaces all order depth for every update. |
| Progressive Update | Replaces order depth slowly over time. |

The record pane 700 is used to control the recording functions of trading simulator. As shown, the record pane 700 is split into a number of separate cells used to control the recording of a particular tradeable object. More record panes may be displayed in the window to record more than one type of tradeable object. The recording fields and controls provided in the record pane might include:

| | |
|---|---|
| Contract Name 702 | Name of the tradeable object being recorded. The name may be color-coded which changes to reflect the status of the exchange connection:<br>White might mean that the market simulator is about to connect to the date feed. Yellow might mean that the market simulator is trying to connect to the data feed. Black might mean that the market simulator is connected to the data feed. Red might mean that the market simulator was unable to connect to the data feed. |
| Contract Selection 704 | Brings up the contract selection dialog box for selecting a contract to be recorded (as opposed to using drag-and-drop). |
| File Saved 706 | Name of the file to which the recording is saved. This file name may be color coded so that when playing in the replay pane at the same time the file is being recorded, both will be the same color to make it easier to match record/replay functions. |
| Record check box 708 | When checked initiates recording of the data for this tradeable object. |
| Data 710 | Indicates the total number of orders that has been recorded. |

To record a tradeable object using the recording pane 700, a user can either drag-and-drop from a window that shows a list of available tradeable objects or via the contract selection dialog box. Then, the user can place a check mark in the Record checkbox to begin recording. The number of tradeable objects traded is indicated in the Data 710 field, while the location and name of the file being recorded is in the File Saved 706 field.

The replay pane 712 is used to control the replay functions of trading simulator. The replay pane 712 is split into a number of separate cells, each of which is a duplicate of the others and is used to control the replay of a separate contract. The playback display fields in individual Training application cells are:

| | |
|---|---|
| Contract Name 714 | Name of the tradeable object being played. The name may be color-coded which changes to reflect the status of the exchange connection:<br>White might mean that the market simulator is about to connect to the date feed. Yellow might mean that the market simulator is trying to connect to the data feed. Black might mean that the market simulator is connected to the data feed. Red might mean that the market simulator was unable to connect to the data feed. |
| Contract Selection 716 | Brings up the contract selection dialog box for selecting a contract to be replayed (as opposed to using the drag-and-drop method). |
| File Saved 718 | Name of the file to which the recording is saved. This file name may be color coded so that when playing in the replay pane at the same time the file is being recorded, both will be the same color to make it easier to match record/replay functions. |
| Open File Button | Open a File Open dialog box to select a file to open or connect to an active data source. |
| Replay Counter 722 | Tracks the current time of the play back for replay pane 712 (note that this could be outside the range of the data file if being played synchronized). |
| Synchronization Dropdown 724 | Dropdown selection box is used to configure how the time is controlled. In one embodiment, there are three available configurations:<br>Free Run, which means that the time for this data feed has no connection with any other pane. Sync Master indicates that the replay pane provides a master time for other panes (stopping, pausing, fast forwarding, etc., affects all slaves). Synchronized indicates the pane is a slave to the Sync Master and therefore uses the time provided by the Sync Master. |

Each of the cells in the Replay pane has a series of buttons on the bottom of the cell that controls various aspects of playback. Note that some of the buttons also functions as status indicators (Start of Data, Rewind, Fast Forward, and End of Data) and they preferably cannot be released, only pressed to bring the replay to the desired state.

| | |
|---|---|
| Start of Data 726 | Moves the replay file to the beginning of the file. The button remains depressed as long as the replay is at the start of file. |
| Rewind 728 | Changes the speed of reverse playback from 1 second every second to 2 sec, 5 sec, 10 Sec, 30 Sec, 1 Min, 2 Min, 5 Min, 10 Min, 30 Min, 1 Hr every second. The rewind button remains depressed as long as speed is not 1 Sec per Sec. A tool tip indicated the current speed, which can also be determined by observing the increment in which the replay clock is changing. Pressing Rewind when playing forward causes the playback to go in a backward direction at the same speed it was going forward. |
| Back 730 | Plays backward at normal (1 sec per sec) speed and releases all other buttons (other then Auto Rewind). Button remains depressed as long as playing the data backward. If clicked while depressed the playback will stop and the button will be released, unless the playback speed is not the normal speed in which case the replay speed will be reset normal speed and the Rewind button will be released. If replay reach the Start of Data then the Start of Day button is depressed automatically. |
| Pause 732 | Stops the replay at the current time (as indicated by the replay clock) and keeps control of the order book—if trading occurs the tool will attempt to maintain the correct market conditions. Pause is different from stop, when the replay stops, there is no control of the order book-no attempt to maintain the current market conditions is made. Play or Back button is pressed while in Pause then the replay takes a single step in the appropriate direction, after the step is taken the replay stays in a paused state. |
| Play 734 | Plays forward at normal (1 sec per sec) speed and releases all other buttons (other then Auto-repeat). Button remains depressed as long as playing the data forward. If clicked while depressed the playback will stop and the button will be released, unless the playback speed is not the normal speed in which case the replay speed will be reset normal speed and the Fast Forward button will be released. If replay reach the End of Data then the End of Day button is depressed automatically. |
| Forward 736 | Plays forward at normal (1 sec per sec) speed and releases all other buttons (other then Auto Rewind). |

| | |
|---|---|
| Fast Forward 738 | Button remains depressed as long as playing the data forward. If clicked while depressed the playback will stop and the button will be released, unless the playback speed is not the normal speed in which case the replay speed will be reset normal speed and the Forward button will be released. If replay reach the Start of Data then the Start of Day button is depressed automatically. Changes the speed of forward playback from 1 second every second to 2 sec, 5 sec, 10 Sec, 30 Sec, 1 Min, 2 Min, 5 Min, 10 Min, 30 Min, 1 Hr every second. Button remains depressed as long as speed is not 1 Sec per Sec. A tool tip indicated the current speed, which can also be determined by observing the increment in which the replay clock is changing. Pressing Fast Forward while playing backward causes the playback to go in a forward direction at the same speed it was going backward. |
| End of Data 740 | Moves the replay time to the end of the replay file. The button remains depressed as long as the replay is at the end of file. If repay file is associated with a current recording, then pressing End of Day will start a Live replay; this will also cause the Play button to be depressed. While in Live replay, the foreground color of the file name in both the record and playback panes will be changed to match each other. |
| Auto Repeat | When pressed, if playing forward moves the current replay time to start of Data every time End of Data is reached. If playing backwards moves the current time to End of Data every time Start of Data is reached. This button is disabled when doing a Live replay. |

Conclusion

The foregoing description is presented to enable one of ordinary skill in the art to make and use the invention. Various modifications to the preferred embodiment will be readily apparent to those skilled in the art and the generic principles herein may applied to other embodiments. Therefore, it should be understood that the above description of the preferred embodiments, alternative embodiments, and specific examples are given by way of illustration and not limitation. For example, it should be known that the system could be modified to record any type of data that might be useful for trading. The data can be stored using any type of data format; whichever is most desirable for a particular system or storage unit. The trading simulator, which plays back the data, might include more or fewer order books to track the recorded market and the simulated market. As previously mentioned, different algorithms for equalizing the two order books can be used. The simulated exchange can be modified to accommodate different matching algorithms. The interface for recording the data and playing back the data can be modified to incorporate more of fewer features. Consequently, these and other changes and modifications within the scope of the present embodiments may be made without departing from the spirit thereof, and the present invention includes all such changes and modifications.

The invention claimed is:

1. A system including:
a computing device,
wherein the computing device is configured to receive market updates corresponding to a tradeable object from a live market at an electronic exchange, each market update comprising a plurality of price levels and an order quantity to buy or sell the tradeable object at each of the plurality of price levels,
wherein the computing device is configured to receive simulated market data comprising order and fill information from a simulated exchange,
wherein the computing device is configured to generate a plurality of simulated orders based on the market updates and the simulated market data, and
wherein the computing device is configured to send the plurality of simulated orders to the simulated exchange, wherein the simulated exchange matches a plurality of orders received from a client device and the plurality of simulated orders to generate the simulated market data.

2. The system of claim 1, wherein the simulated exchange implements a user configurable algorithm.

3. The system of claim 1, wherein the computing device is further configured to provide a time-stamp for each market update as the market updates are received from the live market at the electronic exchange, and to store the time-stamped market updates.

4. The system of claim 3, wherein the computing device is further configured to retrieve the market updates in real time as the market updates are received from the electronic exchange.

5. The system of claim 3, wherein the computing device is further configured to retrieve the market updates later in time than when the market updates are received from the electronic exchange.

6. The system of claim 3, wherein the computing device is further configured to navigate information stored from the market updates, wherein to navigate the information, the computing device is configured to perform at least one of rewinding and fast forwarding the information.

7. The system of claim 1, wherein the computing device is further configured to receive news data as the market updates are received from the electronic exchange, and responsively, time stamp the news data and store the time-stamped news data.

8. The system of claim 1, wherein the market updates comprise at least one of inside market information and market depth information.

9. The system of claim 8, wherein the inside market information comprises a best bid price and a best ask price, and wherein the market depth information comprises quantities at the plurality of price levels.

10. The system of claim 1, wherein the computing device is further configured to generate an order book based on the market updates received from the electronic exchange.

11. The system of claim 10, wherein the computing device is further configured to generate a simulated order book based on the simulated market data received from the simulated exchange.

12. The system of claim 11, wherein the plurality of simulated orders are generated to equalize the order book and the simulated order book to reflect a next state of market data in the order book.

13. The system of claim 1, wherein at least one simulated order corresponding to the plurality of simulated orders comprises an order to delete an order quantity at a price.

14. The system of claim 1, wherein at least one simulated order corresponding to the plurality of simulated orders comprises an order to buy or sell an order quantity at a price.

* * * * *